United States Patent
Maråk et al.

(10) Patent No.: US 10,576,415 B2
(45) Date of Patent: *Mar. 3, 2020

(54) COMBINED DEHYDRATION OF GAS AND INHIBITION OF LIQUID FROM A WELL STREAM

(71) Applicant: Statoil Petroleum AS, Stavanger (NO)

(72) Inventors: Knut Arild Maråk, Trondheim (NO); Arne Olav Fredheim, Trondheim (NO); Bernt Henning Rusten, Jakobsli (NO); Lars Henrik Gjertsen, Jonsvatnet (NO); Baard Kaasa, Kongsberg (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,563

(22) Filed: Feb. 26, 2018

(65) Prior Publication Data

US 2018/0187112 A1    Jul. 5, 2018

Related U.S. Application Data

(63) Continuation of application No. 14/646,791, filed as application No. PCT/EP2012/073648 on Nov. 26, 2012.

(51) Int. Cl.
*B01D 53/26* (2006.01)
*B01D 3/36* (2006.01)
(Continued)

(52) U.S. Cl.
CPC .............. *B01D 53/26* (2013.01); *B01D 3/36* (2013.01); *C10L 3/08* (2013.01); *C10L 3/106* (2013.01);
(Continued)

(58) Field of Classification Search
None
See application file for complete search history.

(56) References Cited

U.S. PATENT DOCUMENTS 2,617,276 A * 11/1952 Gard ................. C10G 5/06
                                                      208/340
2,758,665 A *  8/1956 Francis, Jr. ........... C10G 5/06
                                                      196/132
(Continued)

FOREIGN PATENT DOCUMENTS

FR    2893515 A1    5/2007
GB    2326423 A    12/1998
(Continued)

OTHER PUBLICATIONS

PCT International Search Report and Written Opinion, PCT/EP2012/073648, dated Sep. 19, 2013 (11 pgs.).
(Continued)

*Primary Examiner* — Anuradha Ahuja
(74) *Attorney, Agent, or Firm* — Eversheds Sutherland (US) LLP (57) ABSTRACT

A method and system for dehydration of a gas phase and hydrate inhibition of a liquid hydrocarbon phase in a multiphase hydrocarbon fluid stream containing water. The method may include (i) separating the hydrocarbon fluid stream into a liquid phase and a first gas phase, (ii) adding hydrate inhibitor to the first gas phase, and (iii) separating off condensed liquids and a second gas phase. The first gas phase has a water dew point that is lower than the initial multiphase hydrocarbon fluid stream and the second gas phase has a lower water dew point than the first gas phase. The hydrate inhibitor has a water content that is low enough to enable it to dry the first gas phase, the hydrate inhibitor being separated off with the condensed liquids and mixed (Continued)

with a part or all of the liquid phase from the separation to inhibit the liquid phase.

12 Claims, 3 Drawing Sheets

(51) Int. Cl.
    *E21B 43/36*     (2006.01)
    *E21B 43/40*     (2006.01)
    *C10L 3/10*     (2006.01)
    *C10L 3/08*     (2006.01)

(52) U.S. Cl.
    CPC .............. *C10L 3/107* (2013.01); *E21B 43/36* (2013.01); *E21B 43/40* (2013.01)

(56) References Cited

U.S. PATENT DOCUMENTS

| | | | | |
|---|---|---|---|---|
| 2,801,207 A * | 7/1957 | Laurence | ................. | C10G 7/00 208/340 |
| 3,676,981 A * | 7/1972 | Afdahl | ................... | B01D 53/14 95/153 |
| 4,579,565 A * | 4/1986 | Heath | ..................... | E21B 43/34 95/15 |
| 5,490,562 A * | 2/1996 | Arnold | .............. | B01D 19/0068 166/267 |
| 5,868,005 A | 2/1999 | Larue et al. | | |
| 5,988,283 A * | 11/1999 | Gann | ...................... | E21B 43/01 166/267 |
| 6,016,667 A | 1/2000 | Doerler et al. | | |
| 2005/0145388 A1* | 7/2005 | Hopper | .............. | B01D 17/0217 166/357 |
| 2006/0260468 A1 | 11/2006 | Amin | | |
| 2007/0017575 A1* | 1/2007 | Hall | ........................ | B63B 25/12 137/247 |
| 2007/0029091 A1* | 2/2007 | Stinessen | ................ | E21B 43/01 166/357 |
| 2008/0190291 A1* | 8/2008 | Krehbiel | ................ | B01D 17/02 95/241 |

FOREIGN PATENT DOCUMENTS

| | | |
|---|---|---|
| GB | 2447027 A | 3/2008 |
| RU | 2199375 C1 | 2/2003 |
| WO | 2008035090 A1 | 3/2008 |
| WO | 2013004275 A1 | 1/2013 |
| WO | 2013124336 A3 | 8/2013 |

OTHER PUBLICATIONS

PCT International Search Report, PCT/EP2011/061147, dated Mar. 27, 2012 (5 pgs.).

* cited by examiner

COMBINED DEHYDRATION OF GAS AND INHIBITION OF LIQUID FROM A WELL STREAM

RELATED APPLICATIONS

The present application is a continuation of U.S. application Ser. No. 14/646,791, filed on May 22, 2015, now pending. U.S. application Ser. No. 14/646,791 is incorporated herein by reference in full.

FIELD OF THE INVENTION

The invention concerns a method and system for the combined dehydration of gas so that it is able to satisfy subsea transport specifications and inhibition of liquid hydrocarbon phase subsea in a produced multiphase hydrocarbon fluid stream containing water.

BACKGROUND TO THE INVENTION

In the development of remote or marginal offshore oil and gas fields, subsea developments are often selected in order to reduce investments in production facilities. Although the hydrocarbons produced on site need processing, the number of subsea process units is preferably low and the units of reduced complexity for minimal maintenance and in order to avoid malfunctions. For further processing it is desirable to utilise process capacity within an hub, infrastructure or on land, which may require transportation over long distances by pipelines.

The hydrocarbon well fluid will often contain both oil and gas which may be transported to different processing units to utilize capacity of surrounding infrastructure. The produced hydrocarbon-containing fluid is warm when entering the wellhead, generally in the range of 60-130° C. and will in addition to hydrocarbons contain liquid water and water in the gas phase corresponding to the water vapour pressure at the current temperature and pressure. If the gas is transported untreated over long distances and allowed to cool, the water in gas phase will condense and below the hydrate formation temperature, hydrates will form. The hydrate formation temperature is in the range of 20-30° C. between 100-400 bara.

Hydrates are ice-like crystalline solids composed of water and gas, and hydrate depositions at the inside wall of gas and/or oil pipelines is a severe problem in today's oil and gas production infrastructure. When warm hydrocarbon fluid containing water flows through a pipeline with cold walls, hydrates will precipitate and adhere to the inner walls. This in turn will reduce the pipeline cross-sectional area, which without proper counter measures will lead to a loss of pressure and ultimately to a complete blockage of the pipeline or other process equipment. Transportation of gas over distance will therefore normally require hydrate control.

Existing technologies that deal with the problem of removing such deposits or avoiding them include:
  Mechanical scraping off the deposits from the inner pipe wall at regular intervals by pigging.
  Electric heating and insulation keeping the pipeline warm (above the hydrate appearance temperature).
  Addition of inhibitors (thermodynamic or kinetic), which prevent hydrate deposition.

Pigging is a complex and expensive operation. If no loop is available, a pig has to be inserted sub-sea using remote-operated vehicles. If more hydrates are deposited than the pig diameter is designed for, the pig might get stuck in the pipeline, resulting in costly operations and stop in production to remove the pig Electric heating is not feasible for long-distance transport as both installation and operational costs are too high. Pigging has large operational costs.

Another method to reduce or avoid the use of hydrate inhibitor is to insulate the pipeline and reduce the diameter to increase the flow rate and thereby reduce temperature loss and water accumulation. If the pipeline is not too long, such as in the order of 1-30 km, it will be possible to keep the temperature above the hydrate formation temperature, at which hydrates form. However, this reduces the operational window of the pipeline, and it will not have capacity for future higher gas rates and cannot be operated at low gas rates. Boosting might also be required, as the pipeline pressure drop will be important due to a small sized pipeline. In addition, hydrate formation will occur during production stops and shut downs as the hydrocarbons are cooled below the formation temperature.

To avoid formation of hydrate, a hydrate inhibitor can be added, such as an alcohol (methanol or ethanol) or a glycol such as monoethylene Glycol (MEG or 1,2-ethanediol), which is inexpensive and simple to inject. However, if the water content is high, proportional large amounts of inhibitor are needed which at the receiving end will require a hydrate inhibitor regeneration process unit with sufficient capacity to recover and recycle the inhibitor.

Therefore, there is a need for removing both liquid water and water in the gas phase from a produced hydrocarbon-containing fluid, wherein the ratio of liquid and gas phase is dependent on the water vapour pressure at the prevailing temperature and pressure. The water removal in a hydrocarbon-containing gas, or the water dew-point depression, should be performed before the temperature of the fluid drops below the hydrate formation temperature. In addition, reduced quantities of hydrate inhibitors compared to prior art should be used, i.e. before long transport by pipeline subsea in cold sea water, such as 5 km or more, for example 10, 20, 30, 50, 75 or 100 km or more.

RU 2199375 concerns a method for absorption drying of hydrocarbon gas by using a primary separation step and a cooling step where the gas temperature and dew point of gas is controlled by addition of an absorbent before the cooler, and a second separation step where the absorbent is regenerated for further transport of the gas. The removal of bulk water in the first separation step reduces the load on the absorber, but with the use of an absorber at least one regeneration unit is necessary, which is undesirable in subsea installations.

U.S. Pat. No. 5,127,231 concerns the treatment of a gas from a production well by contacting the gas with a liquid phase, containing water and hydrate inhibitor, in a unit separating off a liquid phase and an additive charged gas which is transported over long distances, which may be several kilometres. A drying process is described involving a contactor with absorbent (glycol). The gas is cooled during transport before entering a heat exchanger where condensate of water solvent and additive is separated form the gas in a settlement vessel. The liquid phase is recycled to the production site. Hence, hydrate inhibitor is added during the first separation and is present during the main transport before cooling, after which the additive is separated at the end reception terminal where the gas is treated.

The methods described above make use of recirculation of anti-hydrate additive introduced during the first separation step on the well stream. This introduction of additive necessitates an absorber unit for regeneration of the additive.

It was therefore desirable to reduce the number of process units at subsea and to minimize the amount of hydrate inhibitor used, so that the gas phase from a production well that may be transported over large distances in cold water without causing hydrate formation, while requiring no or little additive regeneration when reaching a process unit.

A suitable process and system is described in prior application P61001792NO01, which describes a process and system that solves more satisfactorily the problem of how to bring a subsea well stream to a condition more suited for long distance transport with reduced requirement for hydrate inhibitor.

Figure 1:
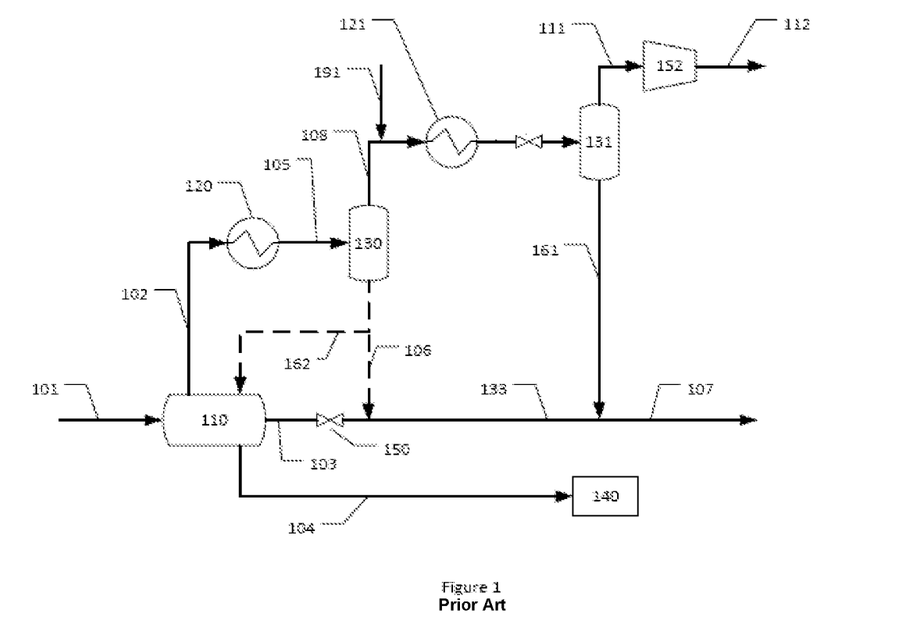
FIG. 1 shows a schematic view of a subsea plant for water dew point depression and water removal according to the prior application P61001792NO01.

The process and system of P61001792NO01 can be understood by reference to FIG. 1. An uninhibited warm well stream 101 enters a first separator 110 where the gas phase goes to a gas cooler 120 which cools the well stream to a temperature above the hydrate temperature (typically 20-25° C.). The purpose of this cooler is to knock out much of the water from the gas without the need for the addition of inhibitor.

The gas phase then continues via 108 and hydrate inhibitor 191 may be injected. A second gas cooler 121 further cools the gas to a temperature near the sea temperature (0-10° C.) to further reduce the water content in the gas.

The majority of the water from 101 and 162 is separated out in 110 and sent via conduit 104 and may be re-injected in the sub-terrain formations by wellhead 140. The remaining liquid continuing in 133 consists mainly of oil and condensate, with small amounts of water. The formation of hydrates in this liquid is inhibited by the liquid stream 161, which contains mainly inhibitor (and water and condensate) if hydrate inhibitor 191 is injected to the gas phase in 108.

The purpose of this invention can thus be seen was to reduce the amount of inhibitor required to inhibit the gas flow 111 and, optionally, the liquid flow 133. This is done by separation of the bulk water in the gas phase by the use of the separators 110, 130, 131.

Although the invention of P61001792NO01 addresses the problem of minimising the amount of hydrate inhibitor used and to some extent reducing the number of process units at subsea, there are a number of problems that exist with this. There will always be water in a well stream, either solved in the gas phase or produced liquid water. When the well stream is cooled, the water in the gaseous phase will condense into liquid water. As discussed above, liquid water and hydrocarbons will form hydrates if the temperature is reduced below approx. 15-25° C., which is the case for the transport from today's subsea satellite fields. As noted above, conventional techniques prior to P61001792NO01 involved the addition of hydrate inhibitor to the entire well stream with all the further processing done further downstream. If the amount of water is large, the amount of inhibitor must be correspondingly large.

Some recent field developments include a separator at the sea bed to take out bulk water from the liquid phase. The bulk water is re-injected and thus the need for inhibitor to prevent hydrates in the pipeline is reduced considerably. At the receiving end of the well stream, the inhibitor is recycled and thus it needs regeneration (i.e. removal of water). This process is both heat demanding and takes up deck space. Reducing the amount of inhibitor required is therefore beneficial, a problem that is addressed to a large extent by the process and system of P61001792NO01.

Also, the three phase flow in the pipeline results in a large pressure drop and it imposes restrictions on the minimum flow velocity due to slugging and riser concerns. At the receiving facility, it also requires extensive separation and treatment. In particular, the gas treatment takes up much space on a platform/FPSO (floating production storage and offloading facility). The treatment of gas at the receiving facility can also be a safety concern. For smaller fields remotely located, it might therefore be smarter to route the gas from many fields to one common process facility, preferably located on land. It is therefore desirable to achieve the bulk separation of oil and gas and moving the first processing to the seabed, enabling routing the gas to one location and the liquids to another, both locations being remotely located and preferably on land. However, in order for this to be achieved it is necessary for the gas phase to satisfy minimum subsea transport specifications with respect to water content.

SUMMARY OF THE INVENTION

The present invention provides a method and system for the dehydration of gas so that it is able to satisfy subsea transport specifications and inhibition of liquid hydrocarbon phase subsea in a produced multiphase hydrocarbon fluid stream containing water.

Thus, in a first aspect of the present invention there is provided A method for the dehydration of a gas phase and hydrate inhibition of a liquid hydrocarbon phase subsea in a produced multiphase hydrocarbon fluid stream containing water, the method comprising the steps of:
  i) separating the hydrocarbon fluid stream into a liquid phase and a first gas phase;
  ii) adding a hydrate inhibitor to the first gas phase; and
  iii) separating off condensed liquids and a second gas phase;
wherein the first gas phase has a water dew point which is lower than that of the initial multiphase hydrocarbon fluid stream and the second gas phase has a lower water dew point than the first gas phase;
characterised in that the hydrate inhibitor has a water content that is low enough to enable it to dry the first gas phase so that the second gas phase is able to satisfy pipeline transport specifications, said hydrate inhibitor being separated off with the condensed liquids in step iii) and then mixed with a part or all of the liquid phase from the separation in step i) to inhibit said liquid phase.

Thus, it can be seen that the method of the present invention is a development of that described in P61001792NO01. The key new features that address the problems of the invention (the combined provision of a gas stream that is able to satisfy subsea transport specifications and a liquid hydrocarbon phase that is protected from hydrate formation) are:
  (a) the addition of hydrate inhibitor having a water content that is low enough to enable it to dry the gas phase from the first separator so that the second gas phase is able to satisfy subsea transport specifications; and
  (b) the hydrate inhibitor that is separated off with the condensed liquids in step iii) is mixed with the liquid phase from the separation in step i) to provide the required inhibition of hydrate formation in the liquid phase.

Exactly what level of purity of hydrate inhibitor is required will vary depending upon the water content in the gas and liquid hydrocarbon phase. This can easily be measured at the wellhead and a hydrate inhibitor with the appropriate level of water can be chosen as required. It can thus be seen that in the present invention the same inhibitor is used for multiple purposes, in order to obtain both a gas phase that is dry enough for rich gas transport purposes and a liquid phase which is inhibited against hydrate formation.

In a second aspect of the present invention, there is provided a system for the dehydration of a gas phase and hydrate inhibition of a liquid hydrocarbon phase subsea in a produced multiphase stream, wherein the system comprises:
 ix) a first separator having a multiphase stream inlet, a first gas phase outlet and a liquid phase outlet; and
 x) a second separator having an inlet, a liquid phase outlet and a gas outlet;
wherein the gas phase outlet of the first separator is in fluid communication with the second separator inlet and wherein gas exiting the first separator gas outlet has a water dew point which is lower than that of the multiphase stream entering the first separator;
characterised in that the fluid communication means between the first separator gas outlet and the second separator inlet comprises an addition point for hydrate inhibitor, the hydrate inhibitor having a water content that is low enough to enable it to dry the gas so that the second gas phase that exits the gas phase outlet of the second separator is able to satisfy subsea transport specifications, hydrated inhibitor being separated off with the condensed liquids via the condensate outlet of the second separator and injected into a part or all of the liquid phase from the liquid phase outlet of the first separator to inhibit said liquid phase.

DETAILED DESCRIPTION OF THE INVENTION

In the following, it is of importance to specify certain differences between the two terms of "water removal" and gas "drying".

"Water removal" means removing a bulk amount of water from a stream and does not result in a dry gas per se.

"Gas drying" concerns the dehydration of a gas in order to satisfy a water content specification of a pipeline for transport. Such specifications vary from pipeline to pipeline. In one typical pipeline, a water dew point of −18° C. at 70 bar is specified. In European sales gas pipelines, a water dew point of −8° C. at 70 bar is specified. This corresponds to a water content from around 80 ppm to 30 ppm, but the specification can also be outside this range. In general, a water dew point below the sea water temperature at 70 bar is typically the minimum requirement. One preferred embodiment sets a minimum requirement for the water dew point of 0° C. at 70 bar, which corresponds to a water content of around 120 ppm. An alternative preferred requirement is a water dew point of −8° C. at 70 bar.

In the present invention, the "optional condensate" produced when the first gas phase is cooled (see below) comprises $C_1$ to $C_6$+ hydrocarbons. Overall, the mixture of liquids that is thus produced after cooling in the optional second gas cooler and it passes to the second separator is a mixture of water, possibly some $C_1$ to $C_6$+ hydrocarbons and hydrate inhibitor. This mixture of liquids exits via the liquid phase outlet of the second separator.

The liquid phase mixture that exits via the liquid phase outlet of the further separator that can be used between the first and second separators (see below) consists of a mixture of water and optionally some $C_1$ to $C_6$ hydrocarbon condensate (the "hydrocarbon condensate").

The most common prior art method for achieving gas drying is by the aid of absorption wherein water is absorbed by an absorbent. The absorbent may for example be a glycol (e.g. monoethylene glycol, MEG, or triethylene glycol, TEG) or an alcohol (e.g. methanol or ethanol). The mentioned need for a low level of water content by use of absorption also requires a regeneration plant in order to remove water from the glycol or other absorbent.

Another common prior art method to obtain such low water content in gas drying is by the aid of expansion and thereby cooling. This method may be performed by a valve or a (turbo) expander, where the work generated by the expanding gas may be re-used in a compressor in order to partly regain the pressure. The temperature of an expander may reach very low temperatures, such as below −25° C., and it is therefore necessary to add a hydrate/ice inhibitor to the gas before it enters the expander.

The present invention concerns combined gas dehydration to give both a gas phase that is dry enough to meet the requirements for rich gas transport purposes and a liquid phase which is inhibited against hydrate formation.

By "water knock-out" is understood the removal of water by condensation.

By "gas dehydration" is understood the process of water removal beyond what is possible by condensation and phase separation.

By "rich gas" is understood a gas that has a water content low enough for transport purposes, a $C_3$+ content low enough to satisfy cricondenbar specifications for single phase gas transport but where the content of $C_3$+ is too high to satisfy sales gas specifications. A rich gas needs further processing to satisfy sales gas specifications.

The present invention enables the production of a rich gas satisfying transport properties at the well head as well as inhibiting the liquid phase. The method and system of the present invention produces rich gas which can be transported a long distance in single phase pipelines before further treatment. It removes the current need for additional measures for long distance transport of rich gas such as heating, the addition of further hydrate inhibitor, insulation of the pipeline and pigging. The gas does not need to be brought to the same location as the inhibited liquid phase. For the receiving plant for the liquid stream, as well as savings in process equipment and deck space, the much smaller gas treatment facility also reduces operational risk. Gas treatment is often regarded as a high risk on an FPSO.

Only power and hydrate inhibitor having a water content that is sufficiently low to enable it to dry the gas so that the third gas phase is able to satisfy subsea transport specifications needs to be brought to the well head. Additionally, a liquid oil/condensate phase with a low amount of water and also a hydrate inhibitor is produced and can be pumped to one processing plant while the gas phase can be transported elsewhere, preferably at a location where deck space is less critical than offshore.

Until now, one chemical has been used for hydrate inhibition in pipelines and another has been used for dehydration on deck. In the present invention, the same chemical is used for both gas dehydration and hydrate inhibition. This reduces requirements for deck space as a regeneration unit for the chemical used for gas dehydration is not required. This simplifies both logistics and storage.

The gas phase from the well stream is now in a single phase that can be transported much further than the multi-phase flows in the prior art. In most cases, this gas is a rich gas where a further treatment is required before sales gas specifications can be reached. This treatment can now be done at a location further away from the well than in the prior art gas production and transport systems.

However, for some fields, where the gas phase is lean and only dehydration is required before a sales gas specification is obtained, the gas could be sent directly to a sales gas pipeline if the dehydration is good. Then, only power production and inhibitor regeneration is required at the surface.

At the same time, the liquid (oil, condensate, water) is degassed and sent as a liquid only for further treatment. The liquid phase makes the transport much simpler than the prior art multi phase pipelines. As the gas volumes reaching the platform/FPSO is dissolved gas in the liquid phase only, the gas treatment facility can be made much smaller.

In a preferred aspect of the present invention, the first gas stream is cooled after mixing with the hydrate inhibitor to condense out water and optionally a hydrocarbon condensate while keeping the fluid above a hydrate formation temperature thereof.

In one particularly preferred aspect of the present invention, the first gas phase is separated into an intermediate gas phase and condensed liquids before the addition of the hydrate inhibitor. In this preferred aspect, prior to this further separation the first gas phase may be cooled to condense out water and optionally a hydrocarbon condensate while keeping the fluid above a hydrate formation temperature thereof.

In another preferred aspect of the present invention, liquid water additionally is separated from the produced multiphase hydrocarbon fluid stream in the method of step i) or system of step ix). This separated liquid water may be re-injected in sub terrain formations.

In a preferred aspect of the first and second embodiments of the present invention, the water content of the hydrate inhibitor is such that the resulting dried second gas phase has a water content of no greater than 75 ppm or a water dew point of −8° C. at 70 bar.

In one preferred alternative of the first and second embodiments of the present invention, the hydrate inhibitor added to the first gas phase or intermediate gas phase has less than 10% water by weight, preferably less than 5% water by weight, more preferably less than 1% and most preferably 0.1% or less water by weight.

In a further preferred aspect of the first and second embodiments of the present invention, the hydrate inhibitor added to the first gas phase or intermediate gas phase is selected from the group consisting of glycols, alcohols, thermodynamic ethane and low dosage hydrate inhibitors (LDHI), preferably glycols, more preferably monoethylene glycol (MEG) or triethylene glycol (TEG) and most preferably monoethylene glycol.

In another preferred alternative of the first and second embodiments of the present invention, the separator used to separate off the condensed liquids and the second gas phase comprises a scrubber that is able to remove at least 99% of liquid (water, hydrate inhibitor and hydrocarbon condensate) from the gas phase, preferably at least 99.5% and most preferably 99.9%. It is preferable that the scrubber is very efficient to minimise the amount of inhibitor entering the second gas phase that is then transported. Preferably, this separator that is used to separate off the condensed liquids and the second gas phase is cooled to a temperature in the range of from −25° C. to +30° C., preferably 0° C. to 10° C. Due to the vapour pressure of the inhibitor, traces of inhibitor in vapour form will inevitably follow the second gas phase, but the low temperature in the second separator will keep this amount at a minimum.

In a further preferred aspect of the first embodiment of the present invention, the condensed liquids from the optional intermediate separation step are mixed with a part or all of the liquid phase from the separation in step i) in the method of the present invention or in a further preferred embodiment of the second aspect of the invention, the condensed liquids from the outlet of the further separator are mixed with a part or all of the liquid phase from the liquid phase outlet of the first separator in ix). In this method or system, the liquid phase is preferably transported to further transporting plants, optionally with the help of pumping.

In one alternative of the method according to the present invention, the first gas phase is cooled down to a temperature in the range of 15-30° C., preferably 20-25° C.

In another preferred aspect of the method according to the present invention, the cooled first gas phase is free of hydrate inhibitor and/or absorbent.

Preferably, the optional intermediate gas phase is cooled to a temperature at or below sea temperature, preferably sea temperature, more preferably 0-10° C.

One preferred alternative of the method according to the present invention comprises the further following steps:
  iv) adding further hydrate inhibitor having a water content as defined above to the second gas phase while keeping the fluid above a hydrate formation temperature thereof; and
  v) separating off condensed liquids and a third gas phase;
such that further drying of the second gas phase to give the third phase is achieved by means of said further hydrate inhibitor, the third gas phase having a lower water dew point than the second gas phase from step iii).

This is particularly suitable for warm well streams with low water content or under conditions where it is difficult to remove water from the inhibitor during regeneration. The two drying stages ensure that the gas phase satisfies the subsea transport specifications while also ensuring that the liquid phase is protected from hydrate formation.

One embodiment of this further preferred alternative comprises the following steps:
  vi) adding further hydrate inhibitor having a water content as defined above to the third gas phase while keeping the fluid above a hydrate formation temperature thereof; and
  vii) separating off condensed liquids and a fourth gas phase;
such that further drying of the third gas phase to give the fourth phase is achieved by means of the addition of said further hydrate inhibitor, the fourth gas phase having a lower water dew point than the third gas phase.

Another alternative method according to any the present invention comprises the further following step:
  viii) adding hydrate inhibitor having a water content as defined above to the multiphase hydrocarbon fluid stream before the first separation step (i).

In this case, the same desired effect is achieved by first adding inhibitor at the wellhead (typically several km away) and then optionally cooling the well stream before it reaches the drying facility. This is particularly suitable for well streams with a lower oil and water content.

In a preferred aspect of the system according to the second embodiment of the present invention, the separator used to separate off the condensed liquids and the second gas phase is cooled to a temperature in the range of from −25° C. to +30° C., preferably 0° C. to 10° C.

In one preferred alternative of the system according to the present invention, the gas outlet of the second separator is connected to a gas transport conduit for further transport subsea. In this arrangement, the gas transport conduit preferably comprises a compressor or pump. Furthermore, where the gas outlet of the second separator is connected to a gas transport conduit for further transport subsea, preferably a conduit connects the second gas cooler outlet to the inlet of the second separator in which said conduit comprises a regulating choke.

In a further preferred aspect of the system according to the present invention, a compact separation technology is used for one or more of the separators, preferably an inline separation technology or a scrubber. Preferably, the first separator is a three-phase separator comprising a fluid inlet, a gas phase outlet, a liquid condensate outlet and a liquid water outlet.

In a further alternative aspect of the system according to the present invention, the liquid water outlet of the three-phase separator is connected to a well head for re-injecting in sub terrain formations.

In a further preferred aspect of the system according to the present invention, the second separator used to separate off the condensed liquids and the second gas phase comprises a scrubber that is able to remove at least 99%, preferably at least 99.5% and most preferably 99.9% of liquid from the gas phase.

In a further alternative aspect of the system according to the present invention, said system further comprises:
  xi) an addition point for adding further hydrate inhibitor having a water content as defined above to the second gas phase outlet while keeping the fluid above a hydrate formation temperature thereof; and
  xii) a third separator having an inlet, a condensate outlet and a gas outlet;
wherein the second separator gas phase outlet is in fluid communication with the inlet of the third separator inlet, the third separator liquid phase outlet is in fluid communication with the second separator and wherein gas exiting the third separator gas outlet has a water dew point which is lower than that of the fluid exiting the second separator, such that further drying of the second gas phase from the second separator to give a third gas phase is achieved by means of the further hydrate inhibitor.

In a further alternative aspect of the system according to the present invention, said system further comprises:
  xiii) an addition point for adding further hydrate inhibitor as defined above to the third gas phase outlet while keeping the fluid above a hydrate formation temperature thereof; and
  xiv) a fourth separator having an inlet, a liquid phase outlet and a gas outlet;
wherein the third separator gas phase outlet is in fluid communication with the inlet of the fourth separator inlet, the fourth separator liquid phase outlet is in fluid communication with the third separator and wherein gas exiting the fourth separator gas outlet has a water dew point which is lower than that of the fluid exiting the third separator, such that further drying of the third gas phase to give the fourth gas phase is achieved by means of the further hydrate inhibitor. These condensates, including the hydrate inhibitor, can be safely transported to another destination, e.g. a nearby oil transport hub.

In another preferred aspect, one or both of the condensate outlets of the optional further separator and second separator are connected to a conduit for recycling said condensates to the first separator.

By using a subsea cooler, the present invention avoids pressure reduction and is flexible with regards to what cooling temperature is required.

In addition the resulting liquid phase remains warm, and it has a much greater heat capacity than the gas phase, as a result of which the separated liquid stream may be transported over long distances before it is cooled to the extent that there is a danger of the formation of hydrates. However, by suitable choice of the of the hydrate inhibitor added, it is possible to achieve both the required gas dehydration and inhibition of the liquid phase even where it is being transported over relatively long distances.

As discussed in the introduction, prior application P61001792NO01 discloses the use of a separator-cooler-scrubber setup as in the present invention in order to remove water and then transfer the gas with minimum injection of hydrate inhibitor. However, neither this prior application nor any other document discloses or suggests the combined provision of a gas stream that is able to satisfy subsea transport specifications and a liquid hydrocarbon phase that is protected from hydrate formation as a result of the addition of a hydrate inhibitor having a very low water content to a separated and cooled gas phase in which the condensates separated off from the gas phase after addition of the inhibitor which contain the added inhibitor are mixed with a part or all of the liquid phase separated off in the separation of the gas from the liquid phase. Thus, the same chemical is used for both gas dehydration and the hydrate inhibition. This reduces requirements for deck space as a hydrate regeneration unit (from the gas) is not required and it simplifies both logistics and storage.

High pressure gas can hold less water than low pressure gas. Therefore, the dehydration process preferably occurs at high pressure. Some fields could have a very low pressure, such as down to around 10 bar, where subsea compression may be required. Then, the dehydration of the present may be conducted after first compressing the gas or, alternatively between the compression stages. For fields where the pressure is moderate, say above 50 bar, dehydration can take place at this pressure and compression may optionally be performed on the gas afterwards (as previously mentioned).

Alternatively where the gas has a low pressure, the dehydration can take place at low pressure if further hydrate inhibitor is injected into the third gas phase (see further embodiment above), requiring another separator and then a fourth gas phase goes to transport.

DRAWINGS

The present invention will in the following be described in further detail by example embodiments with reference to the appended drawings, none of which should be construed as limiting the scope of the invention.

FIG. 1 shows an embodiment of a system and method according to prior application P61001792NO01 wherein an uninhibited warm multiphase hydrocarbon-containing well stream in a pipeline 101 enters a first separator 110 where the gas phase goes to a cooler 120 via a conduit 102 which cools the well stream to a temperature above the hydrate temperature (20-25° C.). The purpose of this cooler is to knock out much of the water from the gas without the need for inhibitor. The separated liquid water phase in conduit 104 separated by the first separator 110 may be re-injected in the sub-terrain formations by wellhead 140.

Condensed liquids of water and condensate are passed from the cooler 120 by conduit 105 to a second separator 130 such as a condensed water scrubber, where the phases are separated into a second gas phase exiting at the top by conduit 108 and a liquid phase exiting at the bottom of the separator 130 by conduit 106. The second separator 130 may as mentioned earlier be a conventional separator or of more compact separation technology, e.g. of inline separation technology or a scrubber.

The condensed liquids from the second separator 130 are taken off in conduit 106 and are mixed with the bulk liquid phase in conduit 103, which may be a mainly hydrocarbon containing stream, from the first separator to a combined liquid phase in conduit 133.

The water content of the second gas phase in conduit 108 after the second separation is reduced, typically the water content is only a fraction of the of the original incoming water content of the well stream in conduit 101.

The second gas phase in conduit 108 is then fed to a second multiphase gas cooler 121. It is suggested in prior application P61001792NO01 that a hydrate inhibitor may optionally be added to the gas phase before entering the second cooler 121, by an addition/injection conduit 191 in order to prevent hydrate formation within the cooler. There is, however, no suggestion that hydrate inhibitor having a lower water content than normal could be used to enable the production of a gas stream that is able to satisfy subsea transport specifications as well as the production of a liquid hydrocarbon phase that is protected from hydrate formation.

The cooled second gas phase is separated from any condensates in a third separator 131, such as a condensed water scrubber, where the phases are separated into a third gas phase exiting at the top by conduit 111 and a liquid phase exiting at the bottom of the separator 131 by conduit 161. This third gas phase may optionally be compressed by a compressor 152 before being routed to a gas transport system 112.

The majority of the water from 101 and 162 is separated out in 110 and sent to injection 104. The separated liquid water phase in conduit 104 may re-injected in the sub terrain formations by wellhead 140. The remaining liquid continuing in 133 consists mainly of oil and condensate, with small amounts of water. It is inhibited by the liquid stream 161, which contains mainly inhibitor, water and condensate. The combined liquid phase 103 and small amounts of water together with condensate and hydrate inhibitor from the outlet 161 of the third separator 131 are combined in the conduit 107. A regulating valve 150 on conduit 103 upstream of the mixing points of conduits 106 and 161 and 103 may be present, in order to prevent flashback into the separator and/or to regulate the mixing rate and composition of said streams. This combined liquid phase is warm and may be transported over long distances as mentioned above before it cools to a temperature level where hydrates may form if hydrate inhibitor has not been added.

The purpose of the invention disclosed in P61001792NO01 was to reduce the amount of inhibitor required to inhibit the gas flow 111 and liquid flow 133. This was achieved by the separation of the bulk water in the gas phase by the use of the separators 110, 130, 131.

Figure 2:
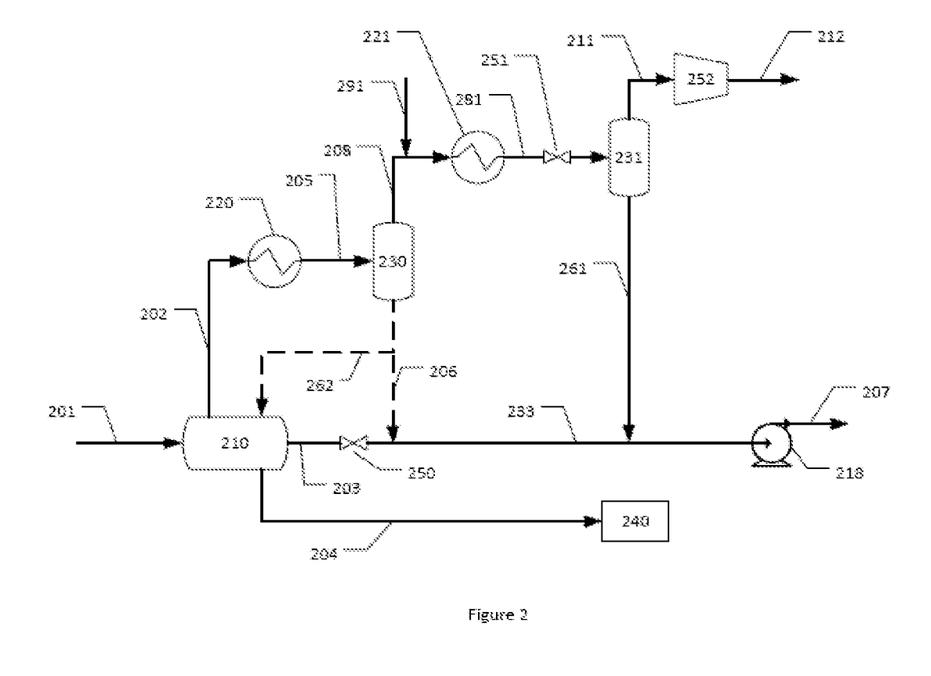
FIG. 2 shows a schematic view of a subsea plant for gas dehydration, water dew point depression and water removal according to the present invention.

FIG. 2 shows a schematic view of a subsea plant for gas dehydration, water dew point depression and water removal according to the present invention. It uses a very similar configuration to the embodiment of the invention disclosed in P61001792NO01.

Specifically a multiphase hydrocarbon-containing well stream in a pipeline 201 is first separated into: a first gas phase in a conduit 202; a first hydrocarbon liquid phase in a conduit 203; and a liquid water phase in a conduit 204 by a first three-phase separator 210, which may be a conventional separator as described above, wherein the separated liquid water phase in conduit 204 may re-injected in the sub terrain formations by well head 240.

The first gas phase in conduit 202 is cooled in a first multiphase gas cooler 220 to knock out water, but above the hydrate formation temperature. Condensed liquids of water and condensate are passed from the cooler 220 by conduit 205 to a second separator 230 where the phases are separated into a second gas phase exiting at the top by conduit 208 and a liquid phase exiting at the bottom of the separator 230. The liquid phase in conduit 206 may in a first embodiment be connected to conduit 203 containing bulk liquid phase from the first separator 210 as described in prior art embodiment. Alternatively, the liquid phase from the first separator may be fed by a conduit 262 back into the first three-phase separator 210, for example to reduce the amount of water in the bulk liquid phase and hence reducing the risk of hydrate formation.

The second gas phase in conduit 208 is then fed to a second multiphase gas cooler 221. Before it reaches the cooler, hydrate inhibitor is added via an inlet 291 (e.g. an injection inlet). It is essential that this hydrate inhibitor fed by conduit 291 must have a water content that is low enough to enable it to dry the second gas so that the third gas phase is able to satisfy subsea transport specifications, e.g. MEG cornprsing less than 5 wt % water, preferably less than 1 wt % water and most preferably 0.3 wt % water or less. It is also important that the hydrate inhibitor and gas phase are well mixed, something which might take place in a mixing unit (not shown).

It is also as a consequence more important that the scrubber 231 (see below) is very efficient, i.e. it can take out as much inhibitor from the gas as possible, preferably such that it is able to remove at least 99%, preferably at least 99.5% and most preferably 99.9% of the liquid phase entering separator 231. The gas exits the cooler in a conduit 281 equipped with a choke valve 251. The choke valve 251 enables regulation of the expansion of the second gas phase and thereby cooling of said phase down below the sea water temperature due to the Joule Thomson or Joule-Kelvin effect. Possibly, it is also desirable that a pump should increase the pressure in liquid hydrocarbon flow 207.

The cooled second gas phase is separated from any condensates and liquid water in a third separator 231, and a very dry third gas phase that is able to satisfy subsea transport specifications exits said separator. This third gas phase may optionally be compressed by a compressor 252 before being routed to a gas transport system 212.

The condensed liquids from the third separator 231, which include the separated hydrate inhibitor that was injected into the second gas phase, leave in conduit 261 and are mixed with the bulk liquid phase in conduit 203 or 233 from the first separator 210 into a combined liquid phase in conduit 207, which contains very little water when condensates including water from the first separator 230 is recycled into the first three-phase separator 210. A regulating valve 250 on conduit 203 upstream of the mixing points of conduits 261 (and possibly 206) may be present, in order to prevent flashback into the first separator and/or to regulate the mixing rate and composition of said streams. As the combined liquid phase is warm, it contains little water and it contains hydrate inhibitor that was originally injected into the second gas phase, this combined liquid phase may as a result be transported over long distances without hydrate formation occurring.

A compressor or a pump 218 on conduit 207 may be used for boosting or for ease of transport of the first liquid phase to further processing plants.

Thus, the inhibitor in 261 is used both for dehydration of the gas, and subsequently, now containing more water, is further used as hydrate inhibitor for the water in the liquid hydrocarbon phase 207. The amount and quality of the inhibitor can be adapted to fit both purposes. This enables the production of a very dry gas in conduit 211 which is able to satisfy subsea transport specifications which can thus be transported long distances via a single phase gas pipeline 212 to a gas treatment plant as well as the production of an inhibited liquid hydrocarbon product which contains small amounts of water in a single phase pipeline 207. The liquid hydrocarbons, including the inhibitor, can safely be transported to another destination, e.g. to a nearby oil hub. The hydrated inhibitor is then regenerated. This can be done by means of a thermal distillation system. This system typically consists of a reclaimer (salt removal) and distillation column. Many such regeneration plants have been built.

Figure 3:
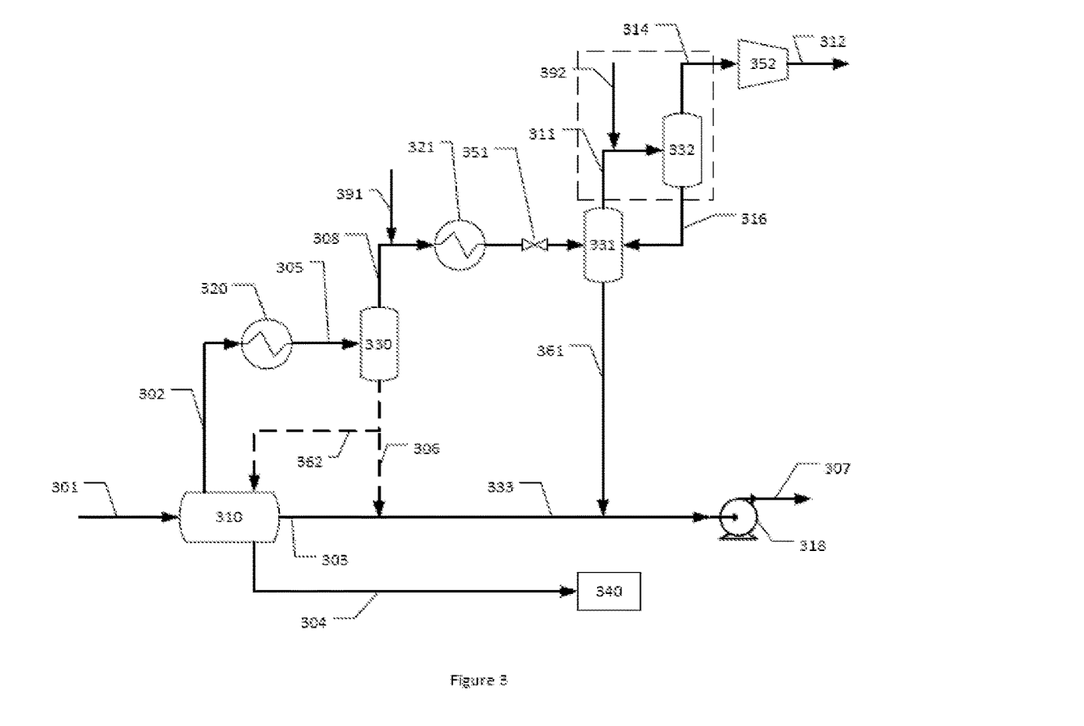
FIG. 3 shows a schematic view of an alternative embodiment of a subsea plant for gas dehydration, water dew point depression and water removal according to the present invention.

FIG. 3 shows a schematic view of an alternative embodiment of a subsea plant for gas dehydration, water dew point depression and water removal according to the present invention. Much of the plant is the same as that described above in relation to FIG. 2. Thus, a multiphase hydrocarbon-containing well stream in a pipeline 301 is first separated into: a first gas phase in a conduit 302; a first hydrocarbon liquid phase in a conduit 303; and a liquid water phase in a conduit 304 by a first three-phase separator 310, which may be a conventional separator as described above, wherein the separated liquid water phase in conduit 304 may re-injected in the sub terrain formations by well head 340.

The first gas phase in conduit 302 is cooled in a first multiphase gas cooler 320 to knock out water, but above the hydrate formation temperature. Condensed liquids of water and condensate are passed from the cooler 320 by conduit 305 to a second separator 330 where the phases are separated into a second gas phase exiting at the top by conduit 308 and a liquid phase exiting at the bottom of the separator 330. The liquid phase in conduit 306 may in a first embodiment be connected to conduit 303 containing bulk liquid phase from the first separator 310 as described in prior art embodiment. Alternatively, the liquid phase from the second separator may be fed by a conduit 362 back into the first three-phase separator 310, for example to reduce the amount of water in the bulk liquid phase and hence reducing the risk of hydrate formation.

The second gas phase in conduit 308 is then fed to a second multiphase gas cooler 321. Hydrate inhibitor is injected upstream of the second cooler 321 via inlet 391. It is essential that this hydrate inhibitor fed by conduit 391 must have a water content that is low enough to enable it to dry the second gas so that the third gas phase is able to satisfy subsea transport specifications. In order to ensure good mixing of the inhibitor and the gas phase, a mixer might be used where 391 enters 308 (not shown). It is also as a consequence more important that the scrubber 331 is very efficient, i.e. it can take out as much inhibitor from the gas as possible, preferably such that it is able to remove at least 99%, preferably at least 99.5% and most preferably 99.9% inhibitor. The cooled second gas phase containing hydrate inhibitor exits the cooler in a conduit 381 equipped with a choke valve 351.

The cooled second gas phase is separated from any hydrocarbon condensate and liquid water in a third separator 331. A third gas phase exits via a gas outlet from the third separator 331 to conduit 311. In this alternative embodiment, conduit 311 is provided with an inlet 392 for adding further hydrate inhibitor to the third gas phase, the inhibitor having a water content that is low enough to dry the gas further. Downstream of the point of addition of the further hydrate inhibitor via inlet 392, the third gas phase is fed via the conduit 311 to a fourth separator 332 having an inlet, a liquid phase outlet and a gas outlet.

Any water and hydrate inhibitor (there will be no hydrocarbon condensate in this further liquid phase) is removed in the fourth separator and a very dry fourth gas phase that is able to satisfy subsea transport specifications exits via the outlet of said separator and is routed via a conduit 314. The very dry fourth gas phase may optionally be compressed by a compressor 352 before being routed to a gas transport system 312.

The third separator 331 is in gas phase fluid communication with the inlet of the fourth separator. Furthermore, the fourth separator 332 condensate outlet is in fluid communication with the third separator 331 via conduit 316. The gas exiting the fourth separator gas outlet has a water dew point which is lower than that of the fluid exiting the third separator 331. As a consequence, further drying of the third gas phase to give the fourth phase is achieved by means of the addition of the further hydrate inhibitor via the conduit 392. A draining system, a pump or other device might be necessary to ensure that the liquid in the bottom of 332 flows into separator 331.

The condensed liquids from the third separator 331 and any liquids from the fourth separator 332 which are fed back into the third separator 331 via conduit 316, which include the two lots of separated hydrate inhibitor that were injected into the second and third gas phases, leave in conduit 361 and are mixed with the bulk liquid phase in conduit 303 or 333 from the first separator 310 into a combined liquid phase in conduit 307, which contains very little water when condensates including water from the first separator is recycled into the first three-phase separator 310. A regulating valve 350 (not shown) on conduit 303 upstream of the mixing points of conduits 361 (and possibly 306) may be present, in order to prevent flashback into the first separator and/or to regulate the mixing rate and composition of said streams. As the combined liquid phase is warm, it contains little water and it contains hydrate inhibitor that was originally injected into the second gas phase, this combined liquid phase may as a result be transported over long distances without hydrate formation occurring.

A compressor or a pump 318 on conduit 307 is used for boosting or for ease of transport of the first liquid phase to further processing plants.

Again, the hydrate inhibitor is being used for a dual purpose of drying the gas such that it gives a rich gas satisfying transport properties while at the same time inhibiting the liquid stream. This embodiment is particularly suitable for a warm well stream with low water content.

Figure 4:
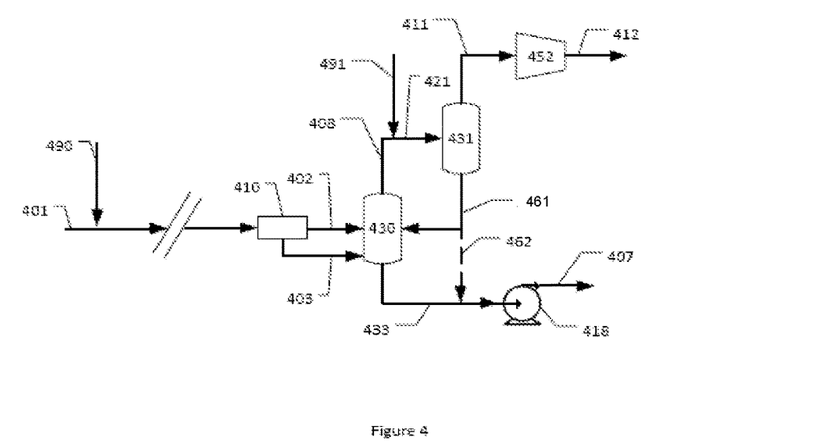
FIG. 4 shows a schematic view of another alternative embodiment of a subsea plant for gas dehydration, water dew point depression and water removal according to the present invention.

FIG. 4 shows a schematic view of a further alternative embodiment of a subsea plant for gas dehydration according to the present invention. Much of the plant is the same as that described above in relation to FIG. 2. The embodiment in FIG. 4 is more suited for well streams containing less water and oil than the embodiments illustrated in FIGS. 1, 2 and 3 and in which the water is solved in the gas phase only. Thus, specifically a multiphase hydrocarbon-containing well stream in a pipeline 401 is inhibited several km away from the subsea plant (typically at or near the wellhead) by the addition of hydrate inhibitor via inlet 490 having a very low water content as previously discussed above in the relation to the first and second embodiments described for FIGS. 2 and 3.

The cooled, inhibited multiphase stream in the pipeline 401 is then separated in a first in-line, compact pre-separator 410 into: a first gas phase in a conduit 402; and a first liquid hydrocarbon and water phase in a conduit 403. The liquid phase 403 will contain water, hydrate inhibitor from 490 and possibly also condensed hydrocarbons and other liquid components from the well stream 401.

The first gas phase in conduit 402 then passes through a short pipeline segment 402 between the pre-separator 410 and a second separator 430. The second separator separates the first gas phase into a second gas phase which exits via a gas phase conduit and a liquid phase which mainly comprises water and which exits via conduit 433. The liquid phase 403 from the first pre-separator 410 is also fed into this conduit 433, so that the hydrate inhibitor added at the wellhead is added to the liquid hydrocarbons separated in the pre-separator.

A second amount of hydrate inhibitor having a low water content as previously discussed above is then added to the second gas phase in the conduit 408 via a conduit 491, optionally with mixing. This second gas phase, having had the second quantity of hydrate inhibitor added to it, then passes via conduit 421 to a third separator 431. In this third separator 431, the second gas phase is separated from any condensates, and a very dry third gas phase that is able to satisfy subsea transport specifications is produced. This third gas phase exits from the outlet of the third separator and passes via conduit 411. It may optionally be compressed by a compressor 452 before being routed via conduit 412 to a gas transport system.

The condensed liquids from the third separator 431, which include the separated hydrate inhibitor that was injected into the first and second gas phases, leave in conduit 461 and are mixed with the bulk liquid phase in conduit 433 from the second separator 430 into a combined liquid phase. The combined liquid phase contains water, inhibitor, possibly condensate and dissolved gas. Furthermore, it contains hydrate inhibitor that was originally injected into the multiphase stream upstream of the plant via inlet 490 and that was injected into the second gas phase via inlet 491 and which exited via the outlet to the third separator 431 in conduit 461 to the third separator. This combined liquid phase in 433 may as a result be transported over long distances without hydrate formation occurring.

A compressor or a pump 418 on conduit 433 may be used for boosting or for ease of transport of the liquid phase to further processing plants via conduit 407.

This alternative embodiment is particularly suitable for well streams with a lower oil and water content and where the water content in 401 is too low to justify an oil/water separation as described as separator 110, 210 and 310 in FIGS. 1, 2 and 3 respectively.

Figure 5:
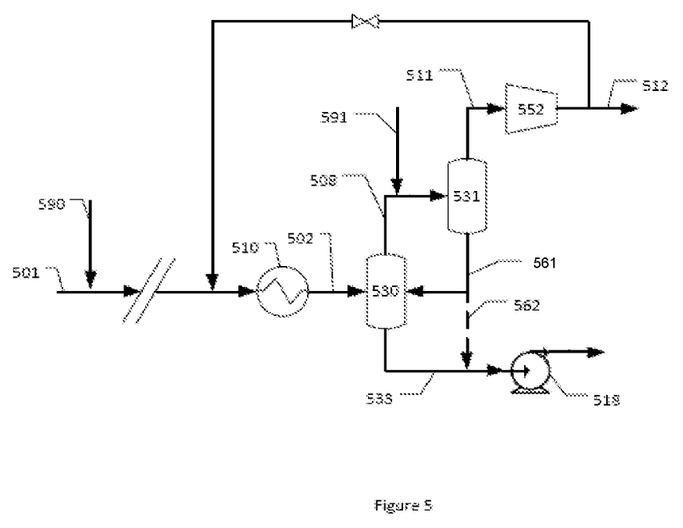
FIG. 5 shows a schematic view of another alternative embodiment of a subsea plant for gas dehydration, water dew point depression and water removal according to the present invention.

FIG. 5 shows a schematic view of a further alternative embodiment of a subsea plant for gas dehydration according to the present invention. As in FIG. 4, this alternative embodiment is particularly suitable for well streams with a lower oil and water content and where the water content in the stream from the wellhead is too low to justify an oil/water separation as described as separator 110, 210 and 310 in FIGS. 1, 2 and 3 respectively.

Thus, specifically a multiphase hydrocarbon-containing well stream in a pipeline 501 is inhibited several km away from the subsea plant (typically at or near the wellhead) by the addition of hydrate inhibitor via inlet 590 having a very low water content as previously discussed above in relation to the embodiments described for FIGS. 2, 3 and 4. If not cooled through transport in the pipeline, the inhibited well stream in the pipeline 501 is cooled in a first multiphase gas cooler 510. This leads to much of the water in the gas phase to be knocked-out, but is still above the hydrate formation temperature. It acts both as an inlet cooler and as an anti-surge cooler for compressor 552 (see below).

The cooled, inhibited multiphase stream in the pipeline 501 is then fed via conduit 502 to be separated in a first separator 530 into: a first gas phase in a conduit 508; and a first liquid hydrocarbon and water phase in a conduit 533. The liquid phase 533 will contain water, hydrate inhibitor from 590 and possibly also condensed hydrocarbons and other liquid components from the well stream 501.

The first gas phase in conduit 508 then has a second amount of hydrate inhibitor having a low water content as previously discussed above added to it via a conduit 591. This cooled first gas phase, having had the second amount of hydrate inhibitor added to it, then passes to a second separator 531 where it is separated from any condensates, and a very dry second gas phase that is able to satisfy subsea transport specifications is produced. This second gas phase exits from the outlet of the second separator and passes via conduit 511. It may optionally be compressed by a compressor 552 before being routed to a gas transport system 512.

The condensed liquids from the second separator 531, which include the separated hydrate inhibitor that was injected into the first gas phase, leave in conduit 561 and are mixed with the bulk liquid phase in conduit 533 from the first separator 530 into a combined liquid phase in conduit 533. Alternatively, the liquid stream 562 is injected into separator 530 to yield an even drier gas leaving 530. The combined liquid phase contains water, inhibitor, possibly condensate and dissolved gas. Furthermore, it contains hydrate inhibitor that was originally injected into the multiphase stream upstream of the plant via inlet 590 and that was injected into the first gas phase via inlet 591 and which exited via the outlet to the second separator 531 in conduit 561 to the second separator. This combined liquid phase 533 may as a result be transported over long distances without hydrate formation occurring.

A compressor or a pump 518 on conduit 533 may be used for boosting or for ease of transport of the liquid phase to further processing plants.

Thus, it can be seen that these different embodiments are particularly suitable for different well streams:

For a well stream with a lot of produced water, FIGS. 2 and 3 are most suited with water reinjection in stream 204/304. Here, the hydrate inhibitor content can be considerably reduced by separating out the water before adding hydrate inhibitor. The additional features in the current application is to provide a dry gas by also using the inhibitor as drying agent and to use the liquid mixture comprising inhibitor that is separated off from the dried gas to inhibit the separated liquid phase.

For a well stream with moderate water content (some produced water), the water injection may not be profitable and the water goes in line 107/207/307 together with the liquid hydrocarbons. As no water is removed from the well stream, all the water must be inhibited. However, the inhibitor provides drying before it is used as inhibitor. The well stream may or may not be inhibited at the well head. If it is not inhibited at the well head, FIGS. 2 or FIG. 3 may be employed. If it is inhibited at the well head, FIG. 4 or 5 are used.

For a well stream with water solved in the gas phase only, FIG. 4 or 5 are used with inhibition at the well head.

The present invention may be further understood by reference to the following example.

Example 1

In this example, separation was conducting using a system as shown in FIG. 2. Well stream 201 had a water cut of 10% and a GOR (gas oil ratio) of 1000 at 90 bar and a temperature of 40° C. The flow rate was 250 kg/s. This entered a first separator 210. The gas phase and possibly some liquid (water and possibly some hydrocarbon) exited from the gas phase outlet of the separator 210 in stream 202. Stream 202 entered a first cooler 220 and was cooled to 25° C. By doing this, the water content in the gas phase in stream 205 was reduced by approximately 50% compared to the water content in the gas phase in stream 202 prior to entering the cooler.

The reduced water content stream 202 was fed into a second separator 230. A reduced water content gas stream 208 exited the second separator 230 and it was then mixed with 11 m³/hour of monoethyleneglycol (MEG) from stream 291. The concentration of MEG in stream 291 was 98% by weight. The mixture of gas and MEG was then cooled in a second cooler 221 to a temperature of 8° C. in stream 281. There was in this case no pressure drop or temperature reduction over a valve 251.

The second gas phase and MEG was fed into a third separator 231. This had an efficiency of 99.5%, meaning that 99.5% of the liquid phase entering the separator exited in a liquid stream 261, the remaining liquid exiting with the gas phase in a gas stream 211 via the gas phase outlet. The water content in stream 211 was now around 35 ppm which is dry enough to satisfy pipeline transport specifications. This gas may optionally be compressed before transport in stream 212.

Most of stream 261 comprised MEG with small amounts of water and possibly small amounts of hydrocarbon condensate which was mixed with stream 233. The resulting aqueous phase in stream 207 contained above 60 wt % MEG which was enough to inhibit stream 207.

Of the 62 tons/hour of water in the well stream 201, more than 56 tons/hour was injected into a reservoir in stream 204.

Example 2

At the subsea wellhead, a wellstream 401 at a temperature of around 70° C. contains a rich natural gas which is saturated with water. The well stream was mixed with inhibitor at a point 490 close to the well head, so that the content of inhibitor was 60% of the total stream of inhibitor and water, by weight. This well stream was fed into a subsea pipeline for transport to a dehydration and compression facility. Due to the presence of the inhibitor itself and the low temperature that can be kept in the presence of the hydrate inhibitor, the gas phase as a result had a water content of around 125 ppm.

The gas phase having a reduced water content produced above was separated off in a first in-line, compact separator 410 before passing to a second separator 430 via conduit 402 where it was separated into a gas phase and a condensate, which comprised mainly water and hydrate inhibitor. The resulting second gas phase in stream 408 exited the gas outlet of the second separator and was then passed into a mixer where a second injection of hydrate inhibitor at 491 took place. This hydrate inhibitor contained around 98% inhibitor by weight. The mixture of natural gas in stream 408 and inhibitor in stream 491 then entered a third separation stage 431 where the liquid phase was removed. The resulting gas phase in stream 411 now contained 30 to 40 ppm water, which corresponds to a dew point of around −18.degree. C. at 70 bar. The water and hydrate inhibitor separated off in the third separator 431 were passed via the liquid phase outlet to a conduit 461 which fed this mixture into separator 430. Alternatively, stream 462 was mixed directly with liquid stream 433. The liquid phase separated off in the first comprising condensed hydrocarbons, water and hydrate inhibitor was fed via the second separator to the liquid phase outlet thereof to the liquid stream 433. The mixture of hydrate inhibitor, water and some condensed hydrocarbons was transported to a further processing plant using an optional pump 418.

We claim:

1. A method for dehydration of a gas phase, the method comprising the steps of:

receiving a first gas phase;

cooling the first gas phase to condense out water while keeping the first gas phase above a hydrate formation temperature thereof, wherein the first gas phase is cooled free of hydrate inhibitor and absorbent to a temperature in the range of 15° C. to 30° C.;

separating off condensed liquids and a second gas phase from the first gas phase, the second gas phase having a lower water dew point than the first gas phase;

adding a hydrate inhibitor to the second gas phase;

cooling the second gas phase after mixing with the hydrate inhibitor to condense out water while keeping the second gas phase above a hydrate formation temperature thereof wherein the second gas phase is cooled to a temperature in the range of 0° C. to 20° C.;

separating off condensed liquids and a third gas phase from the second gas phase, the third gas phase having a lower water dew point than the second gas phase;

adding a hydrate inhibitor to the third gas phase so as to absorb water from the third gas phase; and separating off condensed liquids and a fourth gas phase from the third gas phase, wherein the third gas phase is not cooled between addition (i) of the hydrate inhibitor to the third gas phase and (ii) separating off of the condensed liquids and the fourth gas phase from the third gas phase;

wherein the fourth gas phase has a lower water dew point than the third gas phase; and wherein the hydrate inhibitor added to the third gas phase has a water content to enable it to dry the third gas phase so that the fourth gas phase is able to satisfy pipeline transport specifications.

2. A method according to claim 1, wherein the hydrate inhibitor added to the third gas phase has less than 5% water by weight.

3. A method according to claim 1, wherein the hydrate inhibitor added to the third gas phase is monoethylene glycol, diethylene glycol or triethylene glycol or a mixture thereof, preferably monoethylene glycol or a mixture thereof.

4. A method according to claim 1, further comprising passing the second gas phase through a regulating choke after cooling and after addition of the hydrate inhibitor to the second gas phase.

5. A method according to claim 1, wherein the second gas phase is cooled to a temperature in the range of 0–10° C.

6. A method according to claim 1, further comprising separating a multiphase hydrocarbon fluid stream into a liquid phase and the first gas phase.

7. A method according to claim 6, wherein the hydrate inhibitor added to the third gas phase is separated off from the third gas phase with the condensed liquids that are separated off from the third gas phase, and wherein the hydrate inhibitor and the condensed liquids separated off from the third gas phase are then mixed with a part or all of the liquid phase separated off from the produced multiphase hydrocarbon fluid stream to inhibit hydrate formation in said liquid phase.

8. A method according to claim 6, wherein said liquid phase is transported to further processing plants.

9. A method according to claim 1, wherein the third gas phase is compressed after it exits from a gas outlet of a separator or the fourth gas phase is compressed after it exits from a gas outlet of a separator.

10. A method according to claim 1, wherein the method is performed subsea.

11. A method according to claim 1, wherein the first gas phase is cooled down to a temperature in the range of 20-25° C.

12. A method according to claim 1, wherein the third gas phase is at a temperature in the range of 0° C. to 10° C. when separating off the fourth gas phase.

* * * * *